Sept. 28, 1965     S. H. BINGHAM     3,208,400
RUBBER TIRED RAILWAY TRUCK AND GUIDING DEVICE
Filed May 18, 1964     2 Sheets-Sheet 1

INVENTOR.
SIDNEY H. BINGHAM
BY Darby & Darby
ATTORNEYS

Sept. 28, 1965 S. H. BINGHAM 3,208,400
RUBBER TIRED RAILWAY TRUCK AND GUIDING DEVICE
Filed May 18, 1964 2 Sheets-Sheet 2
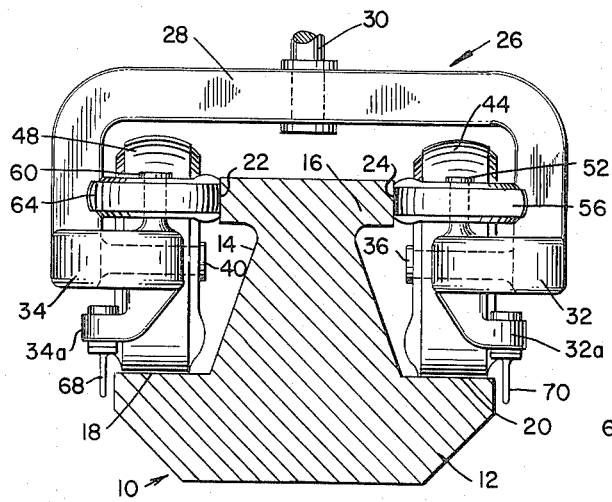
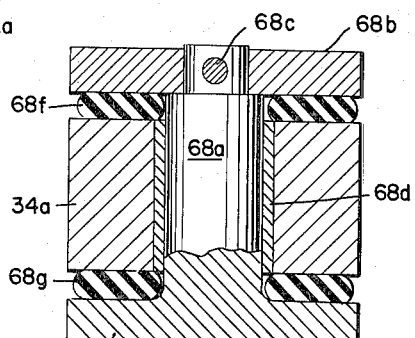
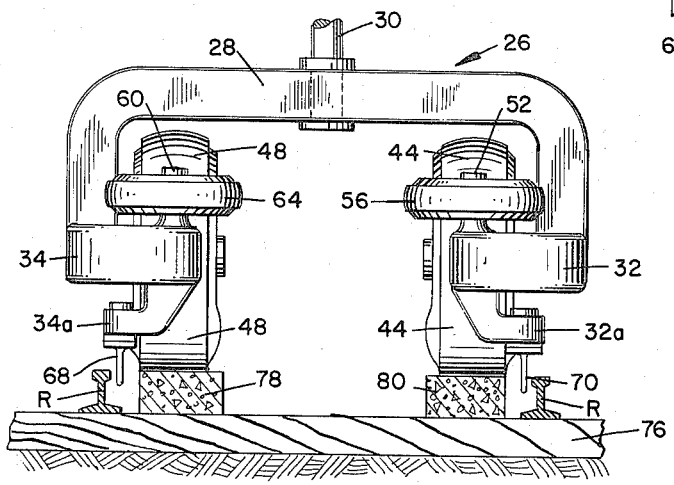
INVENTOR.
SIDNEY H. BINGHAM
BY Darby & Darby
ATTORNEYS

# United States Patent Office 3,208,400
Patented Sept. 28, 1965

3,208,400
RUBBER TIRED RAILWAY TRUCK AND
GUIDING DEVICE
Sidney H. Bingham, 109 E. 35th St., New York, N.Y.
Filed May 18, 1964, Ser. No. 368,257
4 Claims. (Cl. 104—120)

This invention relates to improvements in vehicle trucks adapted to operate interchangeably on beamways and trackways.

In furtherance of this object, the vehicle truck of this invention is capable of operating successively on a beamway or a trackway and of being switched between sections of either type of right-of-way.

The true nature of the invention will be best analyzed after providing a detailed disclosure of the subject matter comprising it.

In a broader sense this invention comprises a transportation system, having as a primary object the provision of vehicle trucks which can operate interchangeably on a beamway of a form to provide for lateral guidance and a trackway wherein lateral guidance is provided by devices mounted on the truck and, as might be apparent, to provide for lateral guidance during switching either on sectionalized beamways, sectionalized trackways or successively disposed sections of either right-of-way.

The single embodiment of the invention selected for illustration is shown in sufficient detail in the accompanying drawings, wherein:

FIGURE 3 is an end elevational view of the truck, showing the beamway in vertical section;

FIGURE 4 is an end elevational view of the truck, showing it at a section of the right-of-way where the beamway is interrupted and the trackway is used, such as would occur, for example, at a switch;

FIGURE 5 is a vertical central cross-sectional view through one of the guide shoes of which two are provided at each end of the truck.

Figure 1:
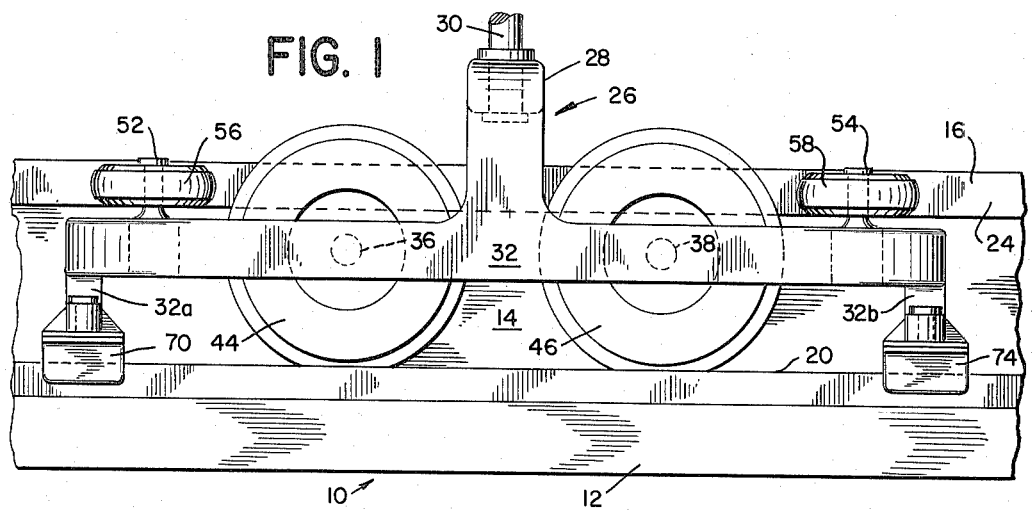
FIGURE 1 is a side elevational view of a vehicle truck in accordance with this invention, showing its cooperation with a beamway.

The beamway 10 is an example of a right-of-way on which the truck of this invention can be operated, it being understood that the details of construction of the beamway are not of prime importance to this invention. As illustrated, the beamway 10 can be likened to an I beam, comprising a bottom flange 12, a vertical central web 14 and a top flange 16. The bottom flange is provided with upwardly facing, horizontal running surfaces 18 and 20, while the upper flange 16 is provided with vertical correlated guiding surfaces 22 and 24.

Figure 2:
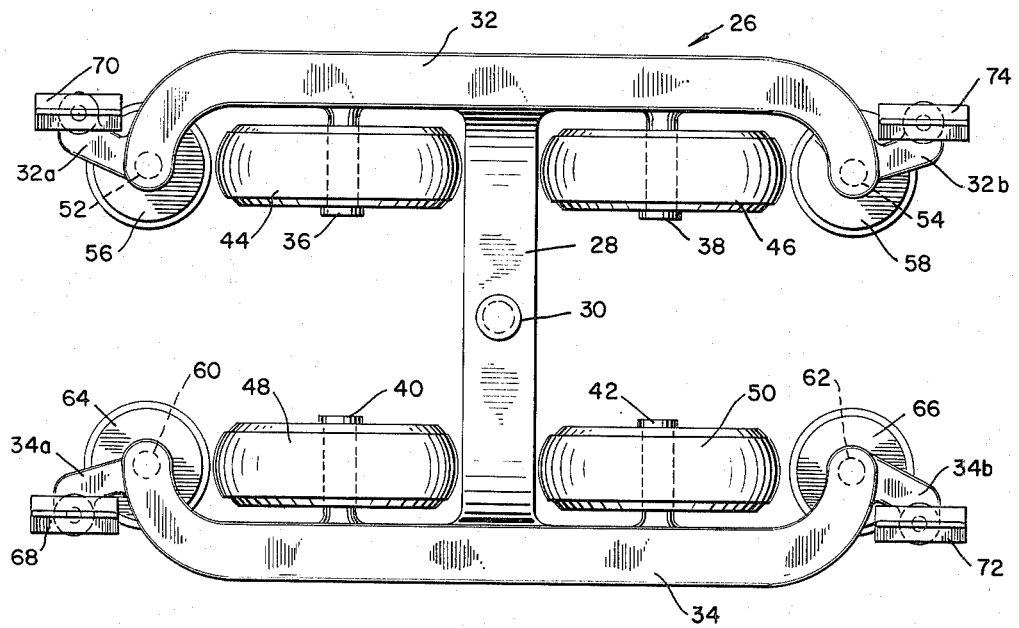
FIGURE 2 is a bottom plan view of the truck.

A single truck is indicated generally at 26, it being understood that at least two of these trucks would be provided for a particular vehicle. The truck comprises a frame, which includes a structural member 28 extending transversely of the right-of-way and corresponding to or being a bolster. The ends of the bolster extend downwardly in vertical parallel planes and provide support for side frame members 32 and 34, which extend forwardly and rearwardly of the bolster 28, see particularly FIGURE 2. At 30 is illustrated a king pin, forming part of a conventional turning bearing through which the truck is connected to the vehicle body, not shown. In the usual vehicle there will be a truck assembly 26 towards each end of the vehicle body, which trucks will be pivotally connected to the body.

At this point it is to be understood, as those skilled in the art will readily recognize, that there are many ways of mounting the vehicle bodies on the trucks including various forms of resilient suspension systems.

Mounted on the side frame members 32 and 34, in longitudinally spaced relation, are stub shafts or their equivalents 36, 38, 40 and 42, on which are journaled the running wheels 44, 46, 48 and 50 respectively. In a preferred form of this invention these running wheels will be rubber tired, the tires being either solid or of the pneumatic type, depending upon the requirements.

At the ends of the side frame members 32 and 34 are vertically extending stub shafts 52, 54, 60 and 62, on which are journaled the guiding wheels 56, 58, 64 and 66 respectively. These guiding wheels are preferably, but not necessarily, also provided with rubber tires which can be solid or of the pneumatic type.

At the ends of the side frame members 32 and 34 are the extensions 32a, 32b, 34a and 34b. Journaled on these extensions for pivotal movement on vertical axes are the substantially planar guide shoes 70, 74, 68, and 72 respectively. These shoes project downwardly, as is clear in the case of the shoes 70 and 74, see FIGURE 1, and 68 and 70, see FIGURES 3 and 4. As illustrated in FIGURE 3, these shoes are laterally spaced so that when the truck is traveling on the beamway these shoes ride parallel to the sides of the bottom flange 12 out of contact therewith. During this type of operation the running wheels will ride on the running surfaces 18 and 20 and the guide wheels will engage the vertical guide surfaces 22 and 24. When the vehicle passes from the right-of-way comprising the beam and moves on to a more conventional trackway, the running wheels will ride on tracks 78 and 80, see FIGURE 4. Since the running wheels are flangeless and in the case illustrated rubber tired, the trackway comprising the elements 78 and 80 is made up of simple longitudinally extending structures, which can be formed of any suitable material, as, for example, wood, concrete, steel and the like. At such sections of the right-of-way, that is, where there is no beamway but the tracks 78 and 80 are used, there are provided steel rails R, see FIGURE 4. The rails are positioned so that the rail head flanges provide guides for the shoes 68 and 70, see FIGURE 4. The shoes 72 and 74 at the other end of the truck are likewise guided by the rails R. Since the beamway does not exist at these sections of the right-of-way, the guide wheels, of course, do not have their function of lateral guidance to permit them to perform their function of lateral guidance for the vehicle and of course the trucks. At these sections the trackway illustrated in FIGURE 4 is provided and lateral guidance is insured by the cooperation of the guide shoes 68, 70, 72 and 74 with the rails R. These guide shoes also cooperate with the switches, not shown, so as to guide the vehicle in accordance with the setting of the switch points along the desired right-of-way.

In order to insure that the shoes will guide the vehicle and its trucks with a minimum of friction they are mounted for pivotal movement on vertical axes, as illustrated, for example, for the guide shoe 68 in FIGURE 5. As previously mentioned, this guide shoe is pivoted on the extension 34a. The guide shoe includes a shaft section 68a which can oscillate in the extension 34a in the bushing or equivalent bearing 68d. The upper end of the section 68a is reduced in diameter to receive a circular plate 68b which is secured thereto for example by means of a pin 68c. Interposed between the top surface of the extension 34a and the disk 68b is a resilient ring 68f, which can be made of any material suited to the purpose. Interposed between the lower face of the extension 34a and an annular flange 68h, integral with the shoe 68, is a similar resilient ring 68g. It will be apparent that this construction permits the shoe to adjust its position as the rail curvatures demand, so as to ride along the rail heads as conditions require with minimum friction. In other words, the shoes can assume a substantially tangent position with respect to rail curvature, so as to slide smoothly there along on whichever side face of the rail head is active at the moment. The resilient rings 68f and 68g serve to prevent the shoes from having too much freedom in their supports and, of course, to prevent rattling.

In passing, it will be noted that the running surfaces provided by the tracks 78 and 80 could be provided by a single slab of material, if desired.

From the above description the construction and the function of the assembly of this invention should be apparent. It is noted, however, for emphasis, that on the beamway lateral guidance is provided by the beam flange 16, but when the trucks are running on the trackway 78–80 lateral guidance for operation, either at or between switches, is provided by the rails R.

Those skilled in the art will readily recognize that the substance of this invention can be incorporated in many specifically different forms of truck assemblies and it is preferred, therefore, that the scope of the invention be determined by the claims rather than the embodiment selected for descriptive purposes. For example, the guiding surfaces 22 and 24 can lie on converging planes.

What is claimed:

1. In a transportation system the combination with a right-of-way comprising beamway and trackway sections, of a vehicle truck comprising a frame, a group of rubber tired wheels journaled on said frame for rotation on horizontal axes and serving as running wheels on the beamway, a group of guide wheels journaled on said frame on substantially vertical axes to provide lateral guidance by the beamway and planar guide shoes on said frame to provide for lateral guidance when said rubber tired wheels are operating on the trackway.

2. In the combination of claim 1, said shoes being mounted for pivotal movement on vertical axes.

3. In the combination of claim 1, said shoes being mounted in pairs fore and aft of the truck frame for pivotal movement.

4. In the combination of claim 1, said trackway comprising running surfaces for said running wheels and rails for guiding cooperation with said guide shoes.

References Cited by the Examiner

UNITED STATES PATENTS

| | | | |
|---|---|---|---|
| 901,194 | 10/08 | Sayer | 104—242 |
| 2,853,956 | 9/58 | Wenner-Gren et al. | 104—120 |
| 2,977,892 | 4/61 | Ihmig | 104—120 X |
| 3,098,454 | 7/63 | Maestrelli | 104—247 |

ARTHUR L. LA POINT, *Primary Examiner.*

MILTON BUCHLER, *Examiner.*